United States Patent [19]

Vincett et al.

[11] Patent Number: 5,299,026
[45] Date of Patent: Mar. 29, 1994

[54] TRACKING THE REPRODUCTION OF DOCUMENTS ON A REPROGRAPHIC DEVICE

[75] Inventors: Paul S. Vincett, Georgetown; Andrew R. Campbell, Toronto, both of Canada; Joachim Guenther, Webster; John W. Wagner, Penfield, both of N.Y.

[73] Assignee: Xerox Corporation, Stamford, Conn.

[21] Appl. No.: 790,309

[22] Filed: Nov. 12, 1991

[51] Int. Cl.⁵ .................. H04N 1/23; H04N 1/40; G06M 7/00

[52] U.S. Cl. .................. 358/401; 358/408; 358/467; 355/202; 377/8; 377/13; 382/36

[58] Field of Search .............. 358/296, 401, 406, 434, 358/440, 468, 448, 467, 443, 442, 408, 300; 382/10, 36, 34; 355/201, 202; 283/902; 377/8, 13

[56] References Cited

U.S. PATENT DOCUMENTS

| | | | |
|---|---|---|---|
| 4,173,408 | 11/1979 | Stewart | 355/202 |
| 4,179,212 | 12/1979 | Lahr | 355/202 |
| 4,728,984 | 3/1988 | Daniele | |
| 4,908,873 | 3/1990 | Philibert et al. | 382/34 |
| 4,977,594 | 12/1990 | Shear | |

OTHER PUBLICATIONS

Xerox Disclosure Journal, vol. 4, No. 1, Jan. 1979, Stamford, Ct.; pp. 117-118; Hickey 'Copyright Accounting System'.

*Primary Examiner*—Edward L. Coles, Sr.
*Assistant Examiner*—Scott A. Rogers
*Attorney, Agent, or Firm*—Oliff & Berridge

[57] ABSTRACT

An apparatus for capturing and recording the content, ownership, and/or bibliographic source of documents reproduced on a reprographic device, and more particularly for tracking the reproduction of specified information, especially copyrighted documents, is connected, preferably detachably, to any of various reprographic devices. The apparatus includes a digitizer for digitizing desired pages (such as those containing title and author information) output from a main portion of the reprographic device, a recording device and medium for storing said digitized pages, a counter for counting the number of reproductions made and optionally inferring the number of originals, a controller for controlling the operation of the apparatus and, optionally, a control panel for interacting with the operator of the reprographic device. When reproducing copyrighted information, an operator makes a reproduction of the pages containing title and author information, digitized images of these pages being stored on the recording medium. The counter counts the total number of copyrighted and other reproductions made, the counted number of reproductions also being recorded on the recording medium. The recording medium is then used to determine the number and nature of copyrighted reproductions made by the reprographic device. The device may also be used for other applications where reproduction of particular types of documents is restricted, or for storing document contents as part of an information storage and retrieval system.

36 Claims, 10 Drawing Sheets

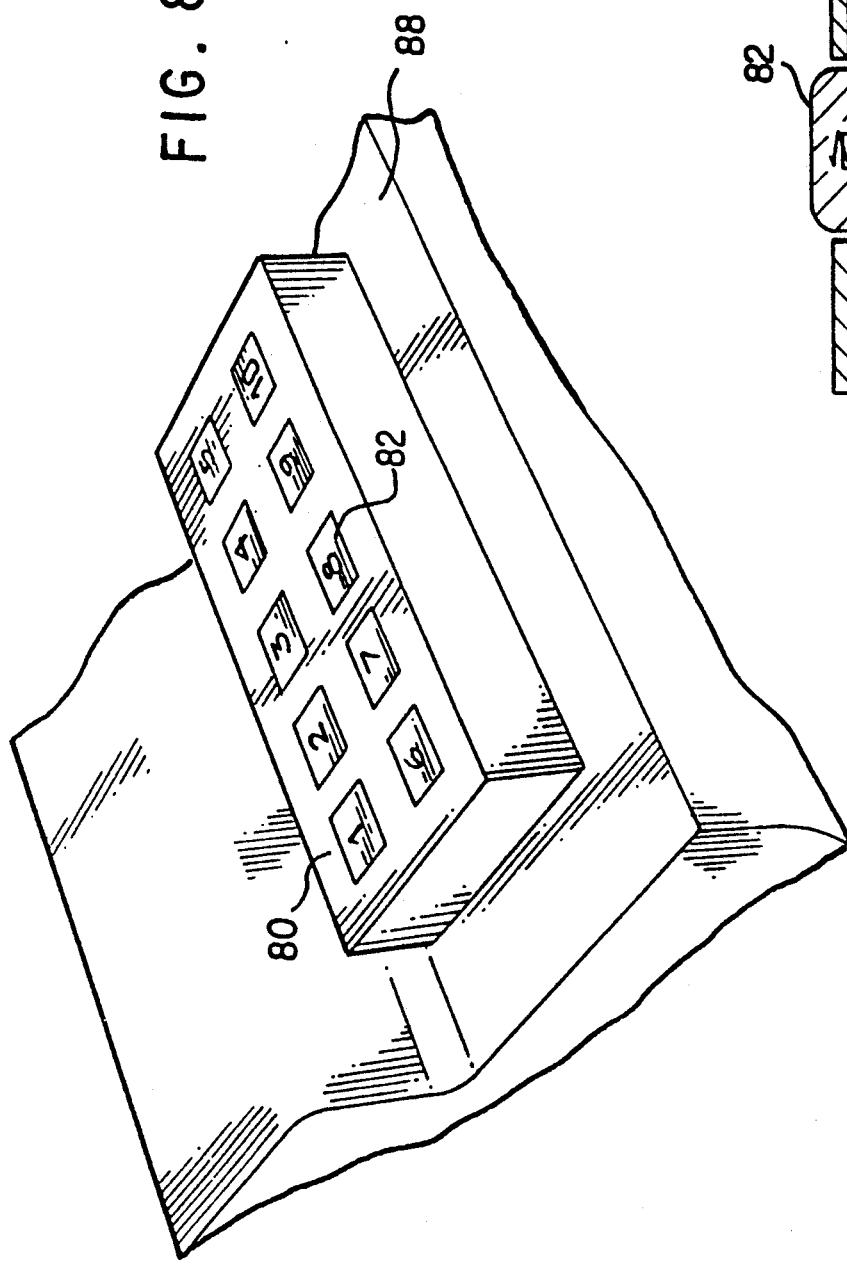
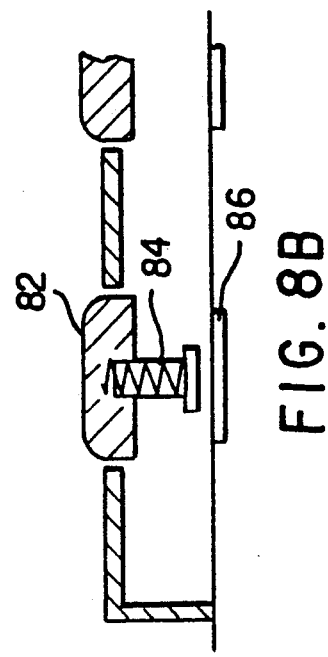

1

TRACKING THE REPRODUCTION OF DOCUMENTS ON A REPROGRAPHIC DEVICE

BACKGROUND OF THE INVENTION

1. Field of the Invention

The present invention relates to the capture and recording of the content, ownership and/or bibliographic source of documents reproduced on a reprographic device, and more particularly to the tracking of the reproduction of specified information, especially copyrighted documents, using an apparatus attachable to a wide variety of reprographic devices.

2. Description of the Related Art

Reprographic devices (by which is meant devices intended for the convenient reproduction in hardcopy form of documents, whether said documents are in paper, other hardcopy, or electronic form prior to said reproduction, including photocopiers, electronic printers, digital copiers, spirit duplicators, and the like) are used to reproduce all types of documents, including documents that should not be reproduced, or whose reproduction should be limited, tracked or controlled. One common example of the abuse of reprographic devices is the copying of published materials subject to copyright. Recently, many governments have updated their copyright laws, and worldwide efforts have been underway to develop a means by which authors and publishers can be fairly recompensed for such copying. For example, non-profit national collectives, usually referred to as Reproduction Rights Organizations (RRO's), implement copyright licensing systems and convey royalties to the authors and publishers. The RRO's derive their authority from national legislation, contracts with the authors and publishers, and bilateral agreements with other RRO's.

An RRO pursues the licensing of specific organizations (e.g., schools, governments and private enterprise). In some cases, specific permission is granted on a case-by-case basis for copying particular jobs, in return for a specific fee. More common than this transaction-based system, however, is a blanket license, which typically operates as follows. The organization agrees to pay royalties to the RRO for the reproduction of copyrighted materials by signing a license to be in effect for a specified number of years. Typically, the licensee's copier usage is then surveyed by sampling a number of locations for a statistically valid length of time, typically a month or two but sometimes up to a year.

The records of copies made during the sampling period are reviewed by the RRO to determine the percentage of copyrighted materials copied. This statistically valid percentage is applied to all copies made by the licensee in order to estimate the total number of copyright copies made by the licensee for all of its locations. The licensee pays the RRO a fixed per copy fee for estimated copyright copies for the duration of the license. Paying such fees is often preferable to the licensee than buying the publications or than continuing to make illegal copies. Of course, while such schemes are commonly applied to photocopying, they could apply to materials reproduced by other reprographic means, such as electronic printing.

In addition to the determination of copyright percentage, many RRO's track information regarding the bibliographic source and/or content of reproduced copyrighted material, e.g., title, author, publisher, type of work (prose, poetry or music, percentage which is photography etc.), from the sampled data, so that individual authors and publishers, or their organizations, can receive proper royalty payments for their works. The published works that are being copied are constantly changing, thus samplings must be repeated on an ongoing basis to ensure that appropriate authors and publishers are identified. FIG. 1 illustrates one such typical copyright compliance system.

As a result of the manual sampling techniques generally used to-date to collect sample data on copyright copying, the sampling procedure is cumbersome. The techniques typically require the copier user to complete a detailed form, or to make an extra copy of the whole copy job together with a notation of the number of copies made. A recent system available from ALL-DATA Abrechnungs-und Sicherheitssysteme Gmbh of Villengen, Germany, automatically keeps track of the number of copies made in a copy job, but still requires the copier user to keyboard an ISBN/ISSN number (the standard international book and serial numbering systems), or to input it using a manual bar-code "wand" if such a code is available on the document. The need for such cumbersome techniques has had a significant impact on both the accuracy of the sampling performed and on the completeness of the information regarding the authors and publishers. Such sampling techniques require a great deal of operator intervention and are thus likely to result in the capture of less than the actual amount of copyright copying, since the copier users tend to bypass these techniques if they are required to perform anything more than minimal additional tasks. Accordingly, the RRO's, authors and publishers commonly receive less than optimal income for the copyrighted works. Further, the difficulty of the sampling techniques discourages user organizations from executing licenses with the RRO's, thus greatly reducing the RRO's potential income. If the samplings capture incomplete author and publisher information, the authors and publishers do not receive fair individual recompense; bar codes, for example, (even if available) typically only refer to the whole publication, like the underlying ISBN/ISSN, and do not identify the authors of individual articles. Finally, with systems of the ALL-DATA type, it is difficult to categorize the nature of the content of the reprographic job (such as prose versus poetry versus music, or the proportion of photographic material), as required by some RRO's, again since most bar code schemes only identify an entire publication U.S. Pat. No. 4,179,212 to Lahr, assigned to Xerox Corporation, discloses a transaction accounting system for the automated royalty accounting of copyright-coded paper documents. The complete automated transaction accounting system includes a document copier and a copier access control system including a transaction data terminal for input of transaction information such as the date of the transaction, coded copyright information such as information contained in the ISSN/ISBN number, user identification and number of copies to be produced. A decoder is provided, the output of the decoder being connected to the transaction data terminal to input the document data. In accordance with this accounting system, a document being copied must be initially coded, at the time the paper is manufactured or printed, by application of special electrically conductive coatings to one or more areas of its surface, in order for the system to recognize the document as copyright. Further, the copier itself has to be provided with a suitable decoder in order to identify the copyright-coded document. Information about the bibliographic source of the document (such as the ISBN/ISSN number) is either coded into the document, or must be input by the user, either by scanning a special bar code imprinted on the document or by keyboard entry. The system cannot be used with any document which does not have the special conductive coating, so is not applicable to the great majority of published and copyrighted documents. The system would be difficult to use with a plurality of different reprographic devices, since it requires a special document platen to sense the paper conductivity; this would make it difficult to economically install such a device for brief consecutive sample periods on many already-existing reprographic devices. Further, the system is very manual in nature, unless a bar code is applied to the surface of the document in addition to the electrically conductive coating. Finally, it is very difficult to identify the author of a particular copied portion of a publication, such as a magazine article, or to categorize the nature of the content of the portion (such as prose versus poetry versus music, or the proportion of photographic material), since most bar code schemes only identify an entire publication.

U.S. Pat. No. 4,728,984 to Daniele, assigned to Xerox Corporation, discloses a data handling and archiving system. The system first transfers a document image into digital signals and then stores the image in memory for later retrieval. An electronic printer having an image input scanner is used for scanning the documents. The printer is equipped with a recognition circuit that reads a bar or other code on the document to distinguish encoded documents from other non-coded documents. The system does not track the copying of certain documents but rather reads the special coded digital images previously placed on the input document, decodes said images and either prints a message based their content or uses their content as auxiliary software to control the printer operation.

While the related art provides a system which attempts to account for the copying of copyright-coded documents, the related art discloses no system which can be used to record information about the bibliographic source (i.e., title, author, publisher and the like) of a copyright document, unless that bibliographic source information is either specially encoded on the document in the form of conductive areas or as a bar code, or the copier user inputs said information manually or by using a manual bar-code wand. In addition, schemes such as the reading of conductive areas of the document not only require special documents but also special copier decoder components, which would make it difficult to install such a device economically for brief consecutive sample periods on many already-existing reprographic devices. Finally, it is very difficult using the related art to identify the author of a particular copied portion of a publication, or to categorize the nature of the content of the portion, since most bar code schemes only identify an entire publication.

OBJECTS AND SUMMARY OF THE INVENTION

An object of the present invention is to provide an apparatus for facilitating the tracking of the copying and other reproduction of certain information, such as copyrighted documents, whose reproduction should be restricted and/or should give rise to a compensatory payment.

Another object of the present invention is to provide an apparatus for tracking the reproduction of certain information, such as copyrighted documents, which can be conveniently and preferably detachably connected to existing reprographic devices made by many manufacturers, without the need to significantly invade proprietary areas of said devices, such as the control electronics or the optical path, and without significantly damaging or marring said devices.

Another object of the present invention is to provide an apparatus for tracking the reproduction of certain information, such as copyrighted documents, in a manner which minimizes intervention by the user.

Another object of the present invention is to provide an apparatus for tracking the reproduction of certain information, such as copyrighted documents, which does not require the use of modified copyrighted documents.

A further object of the present invention is to provide an apparatus for tracking the reproduction of certain information, such as copyrighted documents, which captures the content, ownership, and/or bibliographic source of the copyrighted information.

A further object of the present invention is to capture content, ownership, and/or bibliographic source information about reproduced information, such as copyrighted documents, by automatically and economically capturing and recording an image of at least one of the pages reproduced by the reprographic device during the corresponding reprographic job.

To achieve the foregoing and other objects and to overcome the shortcomings discussed above, an apparatus for tracking the reproduction of particular types of information such as copyrighted information is provided. The apparatus is detachably connected to any of various reprographic devices, but for clarity will be described principally as it applies to a photocopier. In many embodiments, the bulk of the apparatus is connected (or in close mechanical proximity, with electrical connection) to the main portion of the reprographic device, with some or all of the remaining (reproduced paper output) portion of the reprographic device (such as the paper output tray, sorter, stapler or the like) either removed or more commonly moved downstream of (and usually connected to) the apparatus; references to connection and attachment to a reprographic device or photocopier are to be understood to comprise such arrangements. The apparatus includes an imaging means for imaging, preferably digitally, desired pages (such as those containing title and author page information) output from the reprographic device, preferably a counter for counting the number of copies or other reproductions made and optionally inferring the number of originals, a recording device and medium for recording said images (usually after electronic compression and/or other electronic image manipulation) and said copy and/or original numbers, and optionally for recording digital images already available within the reprographic device, a controller for controlling the operation of the apparatus and for performing image compression and the like, and, optionally, a control panel for interactions with the operator of the reprographic device. When copyrighted information is reproduced, an operator makes a reproduction of the necessary pages, images of these pages (after any electronic manipulation) being stored on the recording medium. The counting means counts the total number of reproductions made and optionally infers the number of originals, the counted number of reproductions and originals also being recorded on the recording medium. The recording medium is then used, generally later at a centralized facility, to determine information about the number, bibliographic source, and nature of copyrighted reproductions made by the reprographic device. Since reprographic devices differ rather little in the nature of their paper output portions, and since such portions are usually easily accessible, digitizing the output pages (rather than interposing a detector in the optical path of a copier or decoding the digital input of a printer) enables a high degree of commonality in the apparatus needed for different reprographic devices and minimizes the need to invade the internal portion of the reprographic device. Since the apparatus operates largely automatically, the main complexity of tracking the reproduction of the documents is shifted from the reprographic device user to the centralized processing facility.

BRIEF DESCRIPTION OF THE DRAWINGS

The invention will be described in detail with reference to the following drawings in which like reference numerals refer to like elements and wherein:

FIGS. 8(A) and 8(B) are a view of a reprographic device button overlay according to the present invention;

DETAILED DESCRIPTION OF PREFERRED EMBODIMENTS

Figure 1:
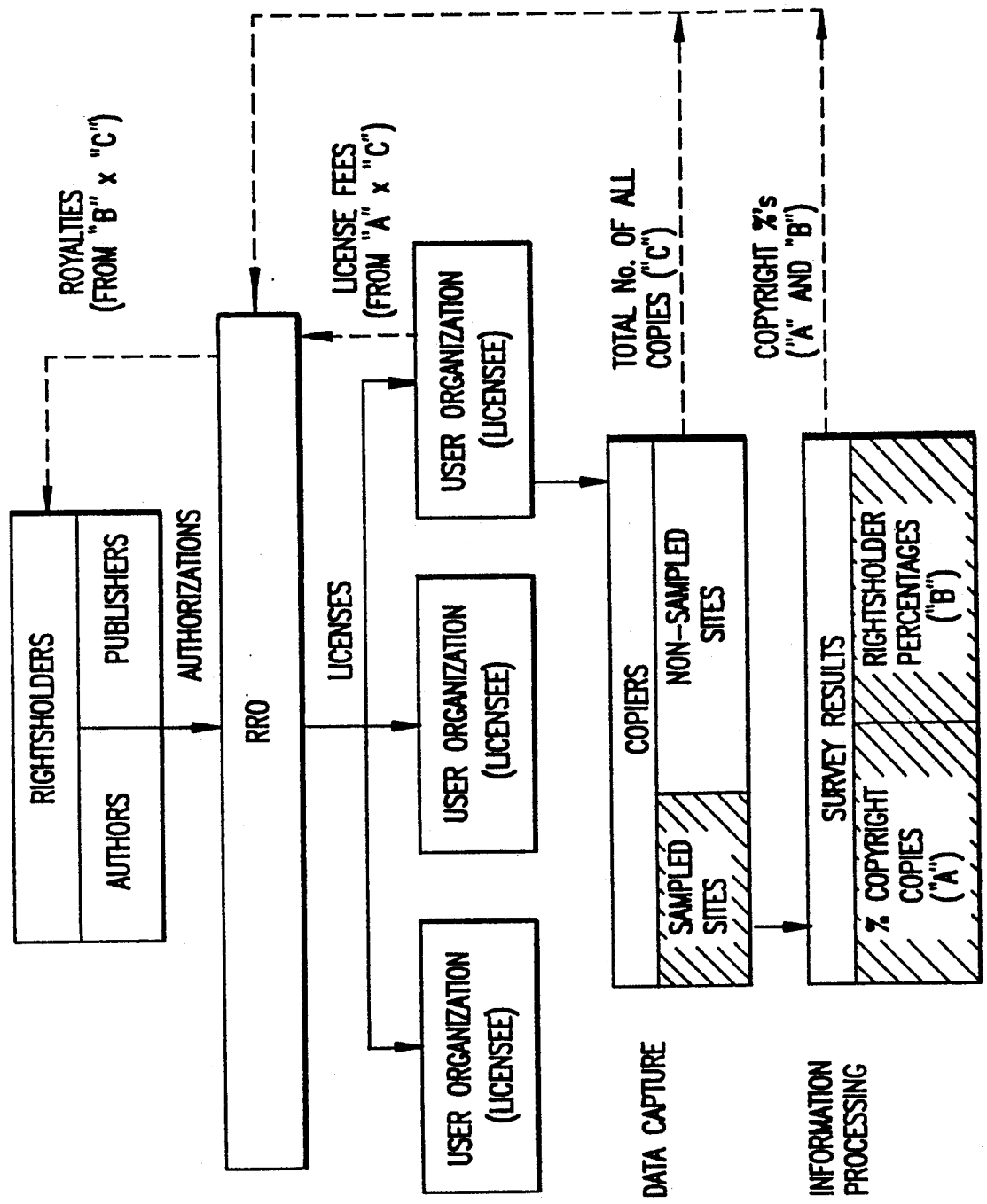
FIG. 1 illustrates a commonly used system for tracking copyrighted information.
Figure 2:
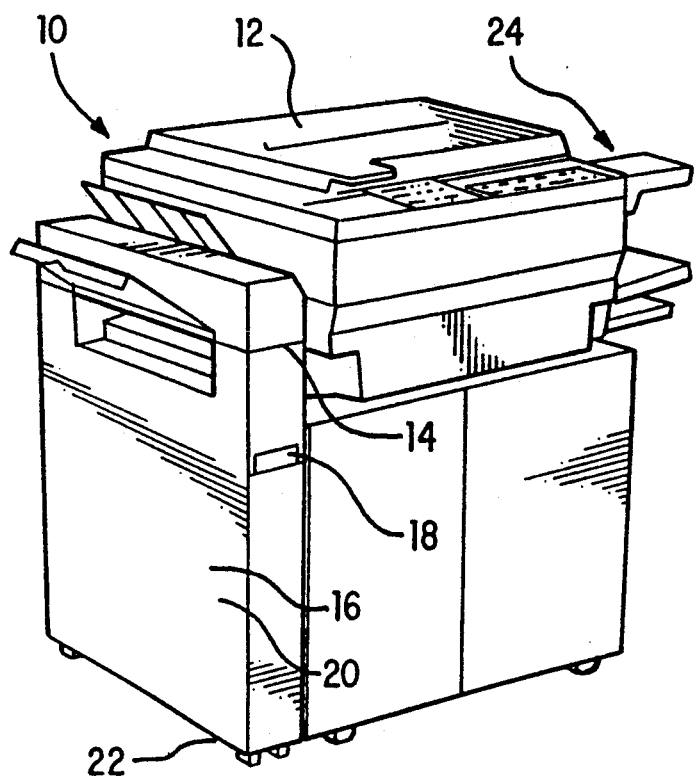
FIG. 2 illustrates an isometric view of the tracking apparatus of the present invention attached to a reprographic device which has a simple paper output tray.
Figure 3:
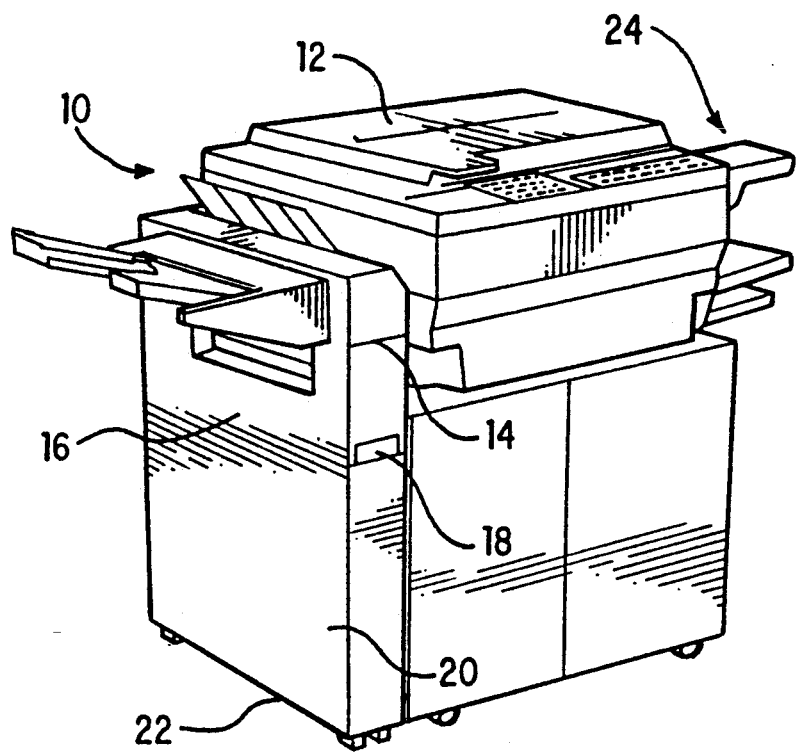
FIG. 3 illustrates an isometric view of the tracking apparatus of the present invention attached to a reprographic device which has a sorter output device.
Figure 4:
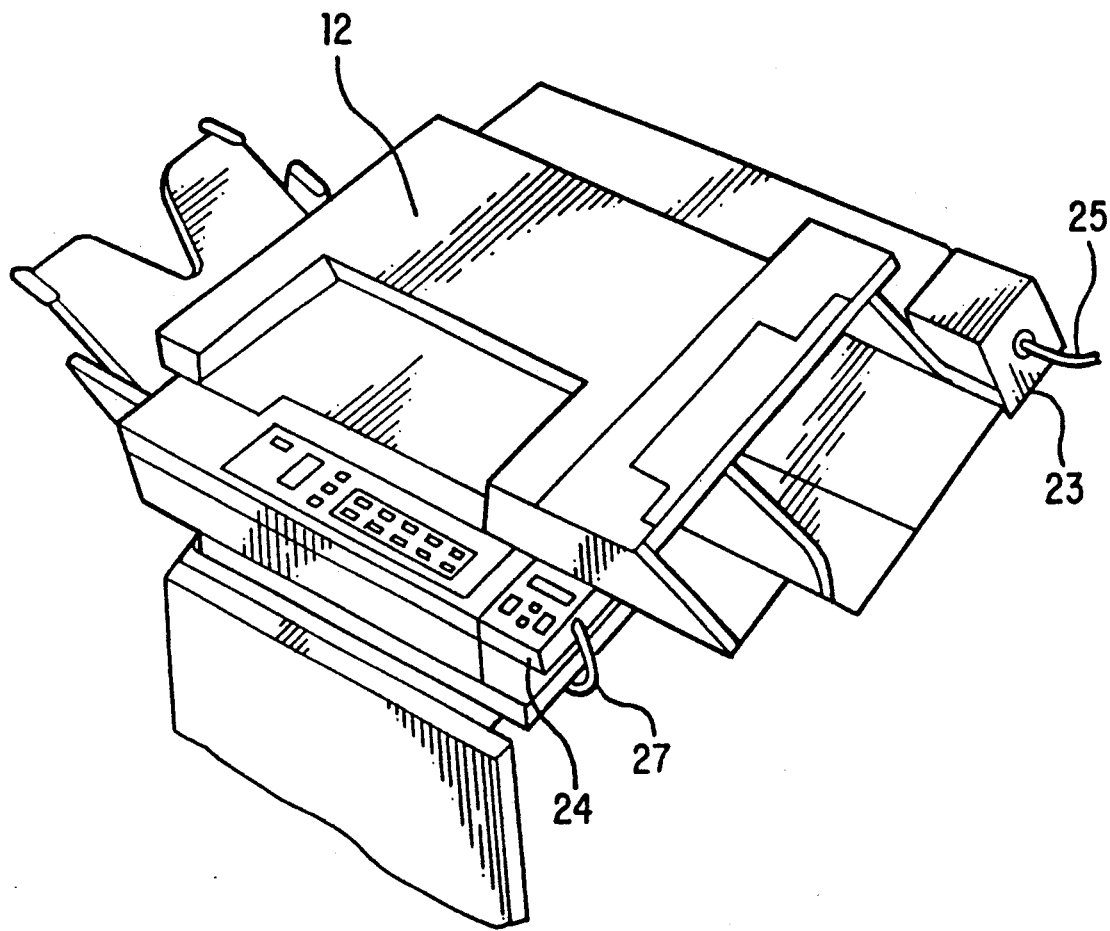
FIG. 4 is a top view of a reprographic device having a control panel according to the present invention attached thereto.

Referring now to the drawings, and particularly to FIGS. 2, 3 and 4 thereof, an apparatus 10 for tracking reproduction of copyrighted information, or of other information whose reproduction should be controlled, limited or tracked, is described. Tracking apparatus 10 is detachably connected to a reprographic device 12 in a manner which does not significantly damage or mar said device. Tracking apparatus 10 has a structure enabling it to be attached to any of various reprographic devices with minor adaptations, such as height and mounting means. Tracking apparatus 10 includes a digitizer 14, a counter 16, a recorder 18, a controller 20, and a control panel 24. Digitizer 14, counter 16, recorder 18, and controller 20 are usually compactly contained within tower 22. Digitizer 14 scans a reproduced page output from reprographic device 12 to create a digitized bit-mapped image of certain reproductions such as the Title and Author Pages of copyrighted material. By "Title Page" is meant a special reproduction of the title page of a book, part or all of whose contents are being copied, or the front page of such a newspaper or magazine; less commonly, it could also be a page containing an identifying bar code, if such is available. By Author Page is meant the page containing the name of the author of the reproduced material where this is not the same as that of the whole publication; this is especially common in periodicals and anthologies. The Author Page is typically assumed to be the first page of the user's actual job, although it may be necessary to make a special reproduction of the page. Digitizer 14 can utilize an integrated contact image sensor of the type commonly used in facsimile machines; such a contact image sensor typically comprises an illumination source, a lens array and an image detector, in one integrated package; said contact image sensor is placed in close proximity to the page being digitized. Alternatively, other known digitization techniques may be used. For example, digitizer 14 can comprise a one- or two-dimensional charge coupled device array used in conjunction with a lens and an illumination system. A one-dimensional charge coupled device array simply scans a document output from reprographic device 12 as the document passes through the digitizer, analogous to many known document input scanners. A two-dimensional charge coupled device array performs in a manner similar to a video camera, capturing one or more still images of a document output from reprographic device 12 during the time the document is in the digitizer. Either a flash exposure is performed or the document is momentarily stopped to enable capture of the image. To obtain sufficiently high resolution with typical two-dimensional charge coupled device arrays, it may be necessary to image different portions of the document sequentially or simultaneously onto one or more arrays, for subsequent electronic integration.

Figure 5:
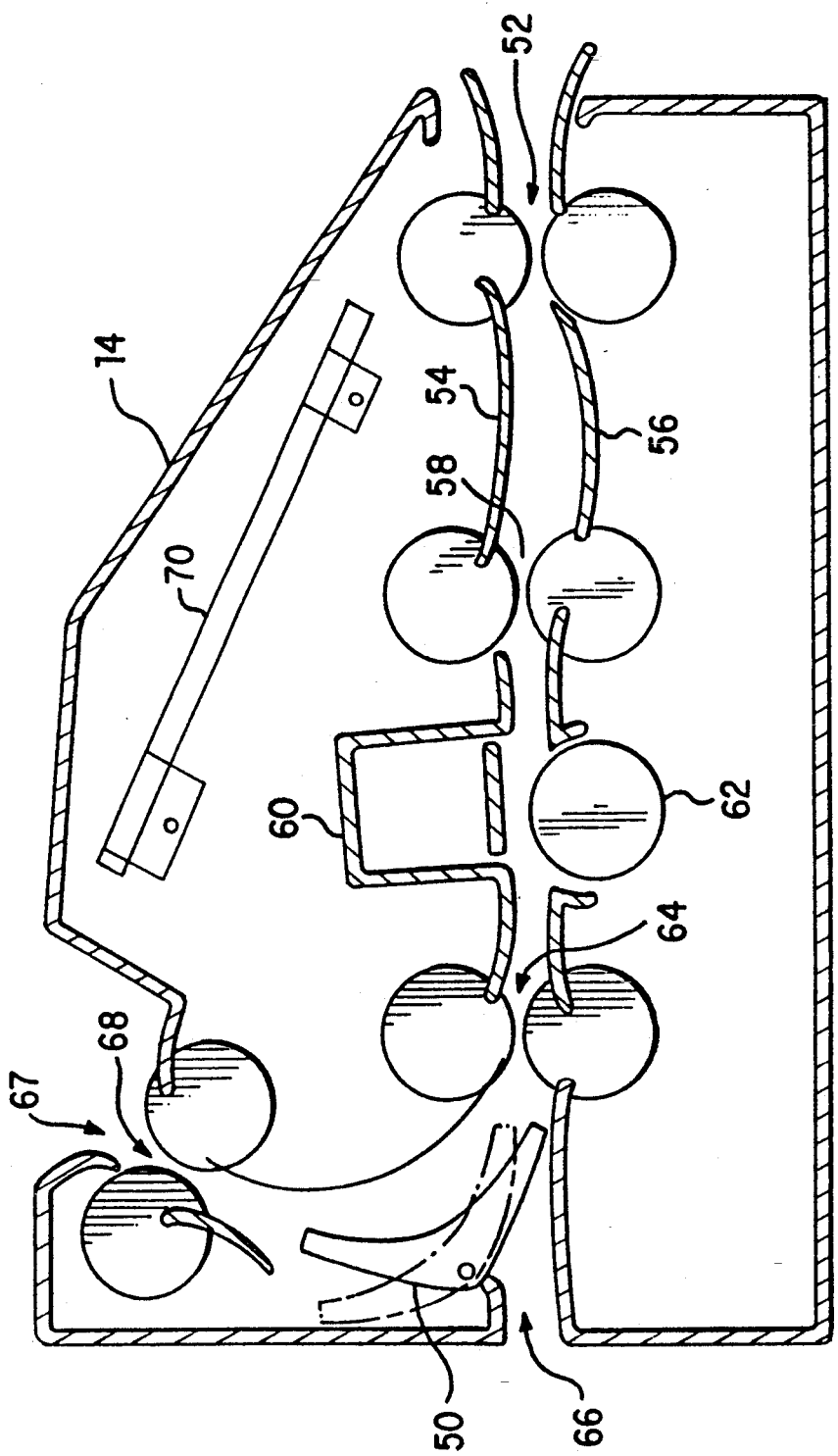
FIG. 5 is a side view of the digitizer portion of an apparatus according to the present invention.

Digitizer 14 is preferably attached, as part of tower 22, between the main portion of reprographic device 12 and the paper output portion (by which is meant the output tray, sorter, stapler, etc.) of reprographic device 12. Digitizer 14 also includes rollers and/or guides to guide paper through the digitizer portion of tracking apparatus 10. If the digitizing sensor is in a main paper path, it may be retractable as necessary to permit passage of stapled sets of pages or of thick paper. Referring to FIG. 5, digitizer 14 can further include a deflector 50 to deflect digitized pages out of a main paper path so as to avoid confusion between said pages and the user's actual job. In FIG. 5, paper enters the right-hand end of digitizer 14 from the main portion of the reprographic device, and passes successively through roller nip 52, past guides 54 and 56, through roller nip 58, between digitizing sensor 60 (in this case a contact image sensor) and its backing roll 62, and through roller nip 64; if the paper has not been digitized, deflector 50 is in the position shown by the dotted line, and the paper exits digitizer 14 at exit location 66. If the paper has been digitized, it is deflected by deflector 50, and exits digitizer 14 at exit location 67 through roller nip 68. Also shown in FIG. 5 is one of the circuit boards 70 of controller 20. In FIG. 5, deflector 50 may optionally be omitted or placed continuously in the position shown by the dotted lines, all pages then exiting at 66.

Alternatively, since the time required for digitization (which is limited by the speed of the digitizing sensor, such as a contact image sensor) may require each digitized page to be slowed down compared with the speed of reprographic device 12, the deflection can be performed by tracking apparatus 10 prior to digitization by sensor 60, thus preventing slow-down of subsequent pages which are not to be digitized. After such deflection, each page may be digitized almost immediately, or several pages may be diverted to a separate tray for later digitization; the latter approach prevents the need for any significant delay between output by the main portion of reprographic device 12 of successive pages to be digitized.

In cases where digitizer 14 must slow down pages output by the main portion of reprographic device 12, in order to obtain acceptable digitizing quality, the requirement for reasonable compactness may dictate that the pages must be forced to buckle into a restricted space between the output of the main portion of reprographic device 12 and digitizing sensor 60. In this case, referring again to FIG. 5, roller nip 52 runs at the speed of the paper output by the main portion of the reprographic device, but nips 58 and 64, and roller 62, slow down to the speed required by digitizing sensor 60 during the time that significant portions of a page are being scanned by said sensor. As a result, paper tends to buckle into the space under guide 56. Nip 52 is placed at such an angle that, in the absence of buckling, paper tends to follow curved guide 54 to nip 58. When nip 58 slows down compared with nip 52, the already curved paper readily buckles further and forces flexible guide 56 (which is fixed at one end) to deflect downwards, thus allowing a buckle to form. Said buckle is removed as paper is fed slowly through nip 58. Guide 56 is made of a strong, flexible material such as a polyester sheet.

If the speed of the digitizing sensor 60 is such that it must slow down pages output from the main portion of reprographic device 12, then the number of pages to be digitized is kept to a reasonable minimum, typically the Title and Author Pages, both of which will typically be reproduced specially. If the digitizing sensor is fast enough not to have to slow down said output pages, then, depending upon the needs of the tracking operation, any or all of the other pages of the user's job may also be digitized by digitizer 14, and it will generally not be necessary to make a special reproduction for the Author Page. For example, the first reproduction of each original may be digitized; typically this is done by digitizing the first page after a pause (corresponding to a change of original on the platen of reprographic device 12) is detected. If desired, an image of each original can be stored temporarily in Random Access Memory, and at the end of the job only the first and last page permanently stored by recorder 18; this enables author information to be determined even if this information is present on the last, not the first page of the original, or if the operator performs the job from back to front so that face-up reproductions end-up in the proper order. In some cases, particularly when a fast digitizer is in use, it may be desirable for operator convenience to omit the Title Page step and to infer as much information as possible regarding the nature and source of the document from the other pages.

Figure 6:
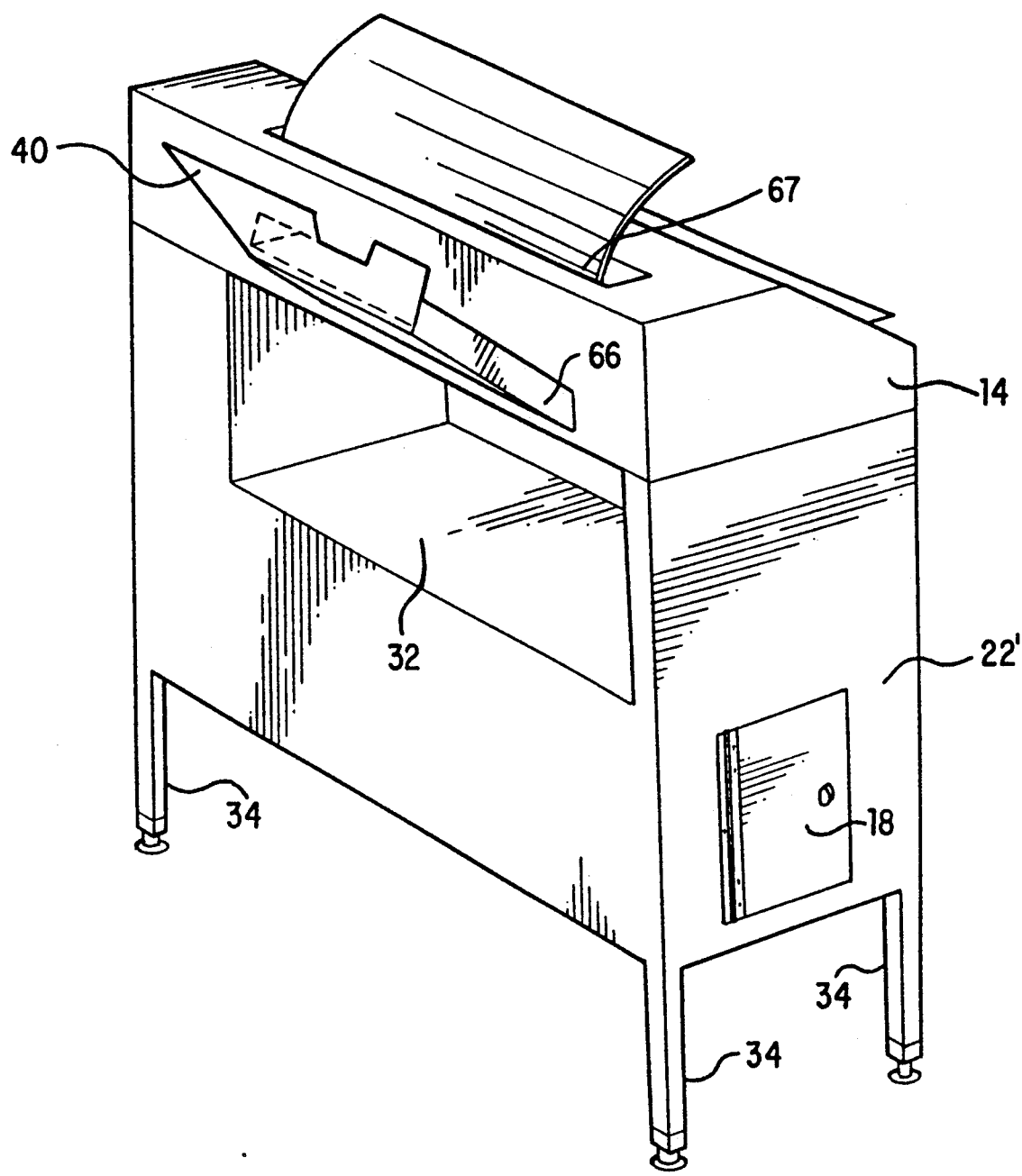
FIG. 6 is a view of a portion of a tracking apparatus according to the present invention, as used with a reprographic device having a simple paper output tray.
Figure 7:
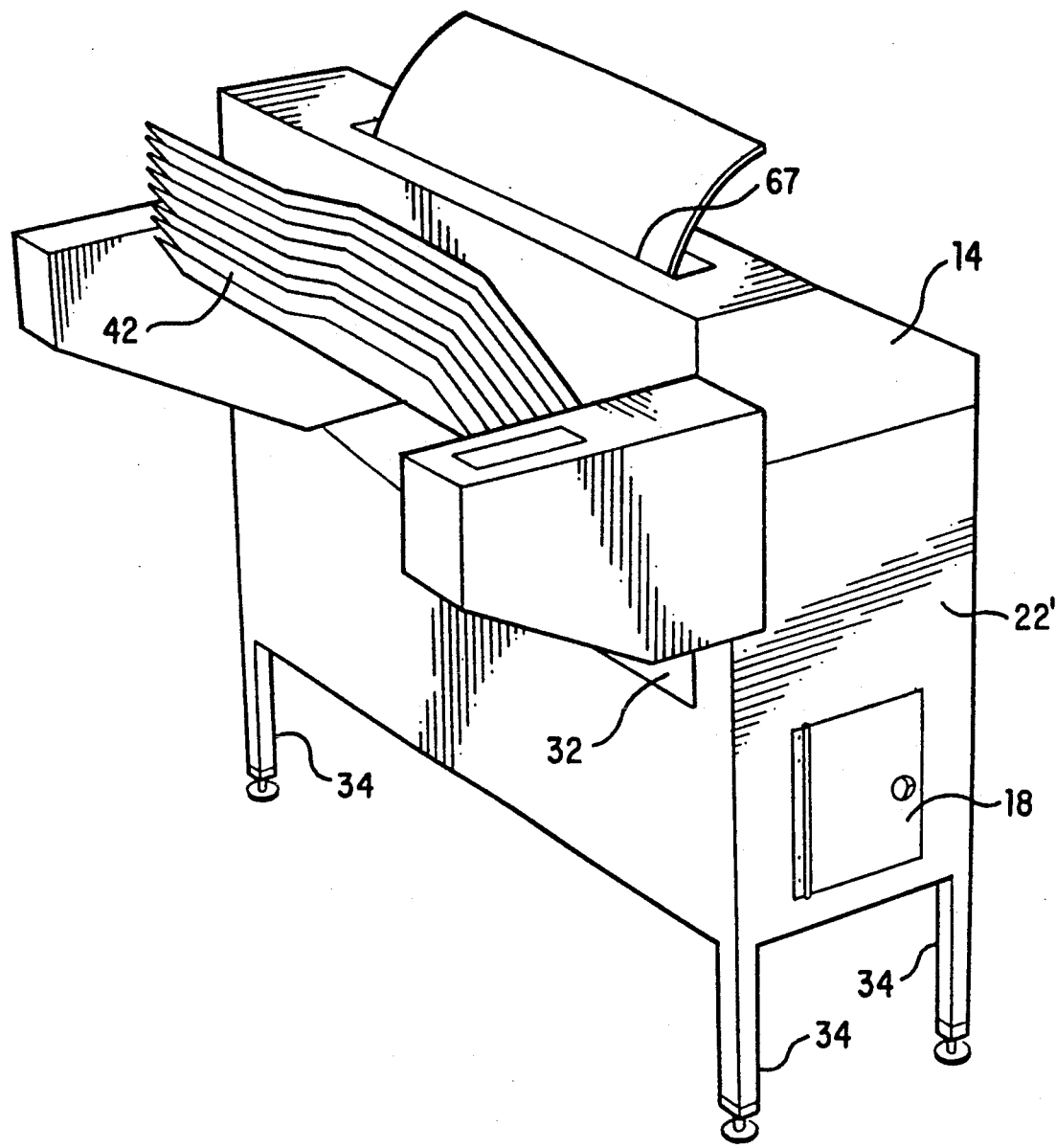
FIG. 7 is a view of a portion of a tracking apparatus according to the present invention, as used with a reprographic device having a sorter paper output device.

In order to render it more easily attachable to a variety of reprographic devices, tower 22 may be of adjustable height and may have cut-outs and the like to allow close proximity to various models of reprographic device, despite protrusions extending therefrom. FIG. 6 shows such a tower 22', having cut-out 32 and adjustable legs 34. The tower 22' shown in FIG. 6 utilizes a digitizer 14 having a deflector which deflects digitized pages to exit location 66 and nondigitized pages to exit location 67. Also shown is paper output tray 40 of reprographic device 12, tower 22' being located between the main portion of the reprographic device (not shown) and output tray 40. FIG. 7 shows a similar arrangement for a reprographic device having a sorter output portion instead of a simple output tray, tower 22' now being located between the main portion of the reprographic device (not shown) and sorter 42.

If tracking apparatus 10 is used in conjunction with a reprographic device which digitizes the input document (e.g. an electronic copier) or which receives digitized input (e.g. an electronic printer), recorder 18 can be arranged to record the digitized image already present in reprographic device 12. Accordingly, tracking apparatus 10 does not necessarily digitize the image from a page output from reprographic device 12. Rather, tracking apparatus 10 may record digital images output from reprographic device 12, or may digitize pages output from said device and then record the digital images so produced.

Counter 16 is connected to a foreign interface connector 23 commonly provided in a reprographic device 12. A foreign interface connector enables attachment of third party devices such as coin-operated and auditron (copy counting) accessories. Foreign interface connector 23 communicates with controller 20 and counter 16 via cable 25. Counter 16 counts the number of reproductions made by reprographic device 12, for recording by recorder 18. The foreign interface connector 23 provides a Start Enable/Disable capability for the reprographic device 12 and produces an electrical pulse for each reproduction made. Counter 16 counts the number of electrical pulses output by the foreign interface connector 23 and controller 20 uses the Start Enable/Disable capability to control (by providing or failing to provide appropriate signals to said connector) the reprographic device in accordance with the actions of the operator, as described later.

The number of reproductions per original that are run in any specific job, i.e., the run length, may comprise information required by the RRO's. Accordingly, counter 16 can also determine the run length rather than simply determining the total number of reproductions made by reprographic device 12, said run length then also preferably being fed to and recorded by recorder 18. To determine the run length in many cases, counter 16 notes the additional pause (in excess of the usual intercopy gap) between successive copy pulses output by the foreign interface connector as a new original is placed on the platen of the reprographic device 12; the run length is then given by the total number of reproductions made, divided by the number of originals so inferred. This method to determine the run length is possible for the majority of copyright reproduction jobs, since originals for most such jobs are contained in bound volumes requiring manual placement of the original on the platen.

Occasionally, copyright reproduction jobs are performed using an automatic original document handler of a reprographic device 12. Many such handlers, particularly so-called automatic document feeders (ADF's, which feed each original from a pile of originals only once and typically use a sorter to collate multiple copies) and semi-automatic document handlers (SADH's, which are a more manual version of ADF's, requiring the user to place each original separately into the feeder area) also permit the detection of run length as described previously, since most such document handlers pause as successive originals are fed therethrough.

When the reprographic device 12 has an automatic document handler which usually does not give rise to significant additional pauses between originals (e.g., a recirculating document handler RDH, which repeatedly feeds the complete set of originals), the situation is more complex. In some cases, the operator may make one copy of each page of a bound original from the platen and subsequently feed the new originals through the handler to facilitate the creation of multiple sets. In this case, the characteristic pattern of several single copies, followed by a large number of copies without an additional pause, allows inference of run length. In cases where the originals are not bound and can thus be fed straight into an RDH (or into an ADF or SADH which does not have significant additional pauses between originals), the number of originals may be determined by other means. For example, RDH's often used a finger which is placed above the top of the document pile in the RDH and falls as originals are fed from the bottom of the pile; when the final original is fed, the finger falls into a slot below it, indicating to the reprographic device that one complete set has been fed. In this case, tracking apparatus 10 may monitor the position of said finger, for example by optical means, or a duplicate finger may be added to perform the same function and to transmit the same information to controller 20. Alternatively, the electronics of the reprographic device may be monitored to detect this information, but this is less desirable since some invasion of the reprographic device is thus necessary.

As an alternative, the mere use of an RDH may be detected, so that the lack of additional pauses does not cause incorrect run length inference. This may be done by a detector (for example an optical detector) in the RDH, analogous to the detector used by the reprographic device itself, or a detector may be added to the cover of the platen of reprographic device 12 to indicate when said cover is open. The pattern of platen openings during copying allows nearly unambiguous determination of whether an automatic document handler is in use. For example, multiple platen openings during the job almost certainly imply that an automatic document handler is not in use, while the absence of such openings likely implies that such use is occurring. Again, the electronics of the reprographic device may alternatively be monitored to detect this information, but this is again less desirable. Another alternative is to request the user to indicate RDH use, for example by pressing a separate button on control panel 24 in response to a prompt on the display of said control panel, or by providing two versions of the "published" button described below, one for RDH use and one for non-RDH use.

Recorder 18 receives bit-mapped digital images sent from digitizer 14, usually after electronic compression or other image manipulation, such as gray-scale encoding, is performed by controller 20. If a bar code or other special pattern of marks is present on the document and forms part of the image, controller 20 may optionally decode the bar-code or recognize the presence and/or content of the pattern by known techniques and provide the decoded bar-code number, an alphanumeric representation of the pattern, or a signal indicative of the presence of the marks to recorder 18, in addition to or in place of said bit-mapped image. Similarly, even if the document and the image do not contain a special bar-code or pattern, controller 20 may optionally use known techniques, such as ICR (intelligent character recognition), to recognize the presence of particular types of characters, such as printed characters, in the image and/or to recognize the content of some or all of the characters and convert them into an alphanumeric representation thereof; said representation, or a signal indicative of the presence of particular types of characters, may then be provided to recorder 18, in addition to or in place of said bit-mapped image. Alternatively, based upon the presence or absence of said pattern or particular types of characters, controller 20 may determine whether or not images from the corresponding document and/or information from counter 16 are to be fed to and recorded by recorder 18.

Recorder 18 can comprise, for example, a magnetic tape drive having a removable magnetic tape cartridge which stores the bit-mapped digital images received thereby. Other possible choices for recorder 18 include any known high-capacity digital read/write storage device, such as an optical disk or optical tape drive, or a magnetic disk drive. In the reproduction of copyrighted information, recorder 18 can store images of the Title and Author Pages (preferably including a gray-scale image of the Title Page, to ensure legibility) of a number of jobs. The available storage area of the recording medium (e.g., the length of a magnetic tape) can be selected in accordance with the expected number of images to be recorded in a particular time before replacement of the medium is deemed to be acceptable. For example, a small magnetic data cassette, of 150 MB capacity, can store at least about 300 such jobs, much more if no gray-scale is used. Recorder 18 also stores the copy volume and other information, such as time and date, generated from tracking apparatus 10.

Controller 20 comprises an electronic controller which manages the interfaces, commands, and sequencing required in the functioning of the components of tracking apparatus 10. Controller 20 also performs other electronic functions, such as compression and other manipulation of the bit-mapped images sent from digitizer 14, diagnostics, error recovery, and the like. Controller 20 is connected to the foreign interface connector 23 via cable 25, and to control panel 24 via cable 27, and to the other portions of tracking apparatus 10.

Control panel 24 is preferably located near the control buttons of reprographic device 12. For copyright tracking, control panel 24 preferably includes special control buttons enabling the user to designate a job as to be recorded or not to be recorded. Said control buttons are labelled in accordance with a determination about the job, such as "published" or "non-published," which a typical user can reasonably make. Activation of one of the control buttons directs the apparatus into one of its two modes. If the "published" button is activated, the tracking apparatus 10 is operative. If, however, the "non-published" button is activated, tracking apparatus 10 is rendered largely inoperative, except that the total number of reproductions made is preferably still tracked, so that the percentage of copyright reproductions can later be calculated. Preferably, the reprographic device 12 is rendered inoperative by controller 20 (utilizing the foreign interface connector) until one of the special control buttons is activated. Control panel 24 preferably includes an LCD or other instruction panel placed near the operation buttons of the control panel. Since controller 20 preferably causes tracking apparatus 10 to time out (ready for a new job) after a certain delay between reproductions (so that two jobs are not incorrectly treated as one), control panel 24 preferably further includes a "continue" button enabling tracking apparatus 10 to continue an interrupted job and to count later reproductions as part of the job.

The two modes, "published" and "non-published," are necessary to avoid the digitization and recording by tracking apparatus 10 of non-published confidential documents. If, on the other hand, such digitization and recording is acceptable, tracking device 10 may digitize and record part or all of all documents reproduced or of a random selection thereof; control panel 24 may then be omitted.

As an alternative means of determining run length in a job, or to detect other actions by the user (such as pressing the Start button or selecting duplex, i.e., two-sided reproduction), information about the reprographic device buttons pressed by a user may be captured by placing an overlay of special buttons over certain buttons (such as those used to indicate the required number of copies) of the reprographic device 12. Referring to FIG. 8, the overlay comprises an array of buttons 80 similar to corresponding buttons (in this case, the run-length selection buttons) of the reprographic device 12 on its control panel 88. Such an overlay electrically senses presses of the overlay buttons and transmits this information to controller 20; it also transmits the pressing force to the corresponding reprographic device buttons, either mechanically or electromechanically, for example, by relays. FIG. 8 illustrates a simple mechanical transmission, whereby pressing overlay button 82 causes spring plunger 84 to come into gentle contact with corresponding reprographic device button 86. This overlay approach may be used to overcome the difficulties previously described with respect to automatic document handlers, or if the reprographic device does not have a foreign interface connector, or similar device, to provide information about the number of reproductions made. In the latter case, the total number of reproduced pages could be inferred by counting the number of pages passing through digitizer 14. Alternatively, the information obtainable by said overlay approach may be obtained directly from the electronics of the reprographic device, or the electrical output of the overlay could be used to control said electronics; such approaches, however, are less preferred because they usually require invasion of the internal workings of the copier.

With sorters, and sometimes with other output portion devices of reprographic device 12, the reprographic device 12 may incorrectly infer a paper jam because of the delay in arrival of the paper at the output portion, caused by the interposition of Digitizer 14. Accordingly, "false" signals can be provided by tracking apparatus 10 to the reprographic device 12; for example when the paper enters the digitizer 14, the signal normally sent when the paper enters the output portion (such as a sorter) may be sent to the main portion of reprographic device 12, with the usual signal (which will be generated later by the output portion) being prevented from reaching the main portion of the reprographic device. In addition, signals from the main portion of reprographic device 12 to the sorter may be intercepted by the controller 20 and then retransmitted after a short delay.

Figure 9:
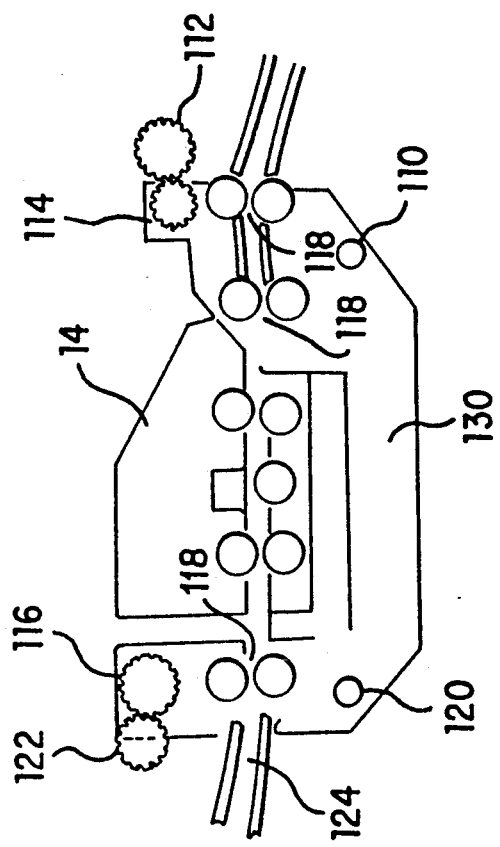
FIG. 9 is a view of a device for transmitting paper and various mechanical motions through the apparatus according to the present invention.

In some reprographic devices 12, the sorter (or other paper output portion) is so integrated with the body of the reprographic device that a larger portion of the reprographic device (including the usual paper output portion and one or more paper nip rollers which are normally driven from the reprographic device) may preferably be moved downstream of the digitizer 14. Sometimes, paper output devices, such as staplers, are also normally driven by mechanical connection to the main portion of reprographic device 12. Situations of this kind require special means (known as a Cradle, from its shape) to convey the required motion to the displaced rollers and/or paper output device. The paper output module of the reprographic device 12 (which includes the paper output portion itself, plus a frame and various gears and rollers) is moved downstream, and (referring to FIG. 9) the Cradle 130 is interposed between it and the main portion of reprographic device 12. Cradle 130 is attached to the main portion of reprographic device 12, typically by positioning the Cradle on the pins normally used for the output module using mounting 110, and coupling the Cradle to the drive gear 112 of the reprographic device. Cradle 130 comprises gears (two of which are shown as 114 and 116) and drive belts connecting them (not shown) to transmit the required motion from gear 112 of the main portion of the reprographic device to gear 122 of the output module, and hence to the components of said module. Cradle 130 also comprises paper transport rolls 118 that direct pages from the main portion of the reprographic device into the digitizer 14 (which is attached to the Cradle), and thence to the entrance 124 of the output module. The downstream side of the Cradle replicates the pins and drive gear of the main portion of the reprographic device so that the output module can be reattached. A replicated pin is shown as 120 and a replicated gear as 116.

Figure 10A:
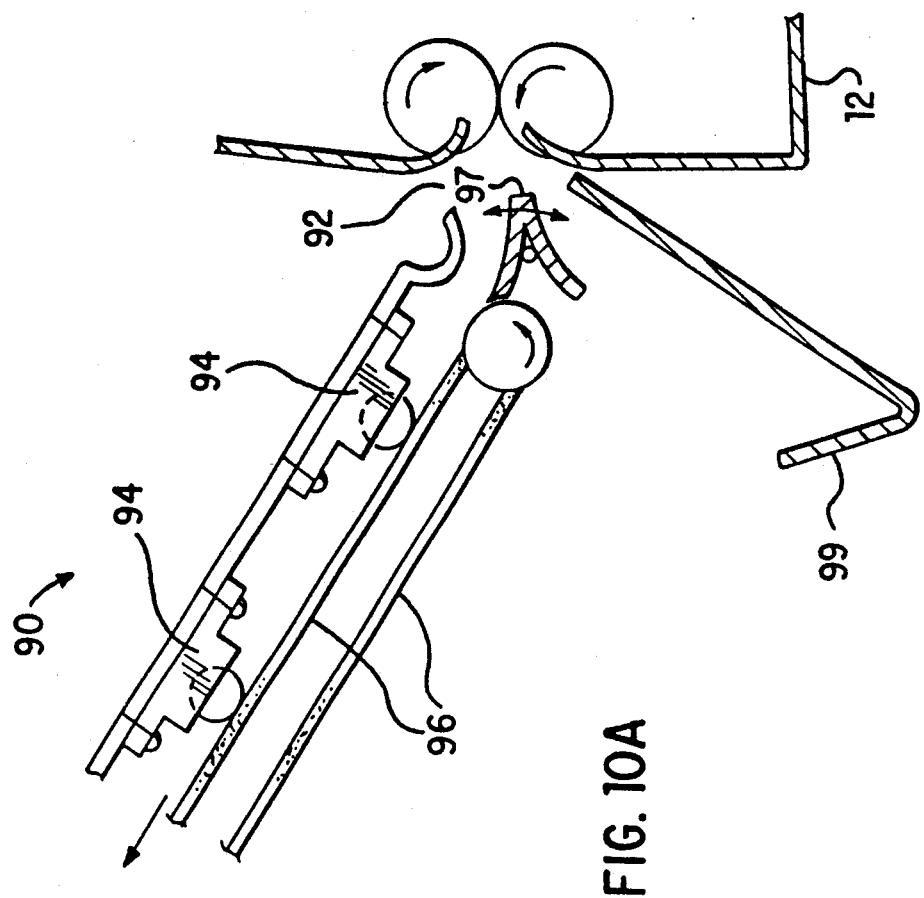
FIGS. 10A and 10B are views of a method for transporting paper from a reprographic device to an apparatus according to the present invention.
Figure 10B:
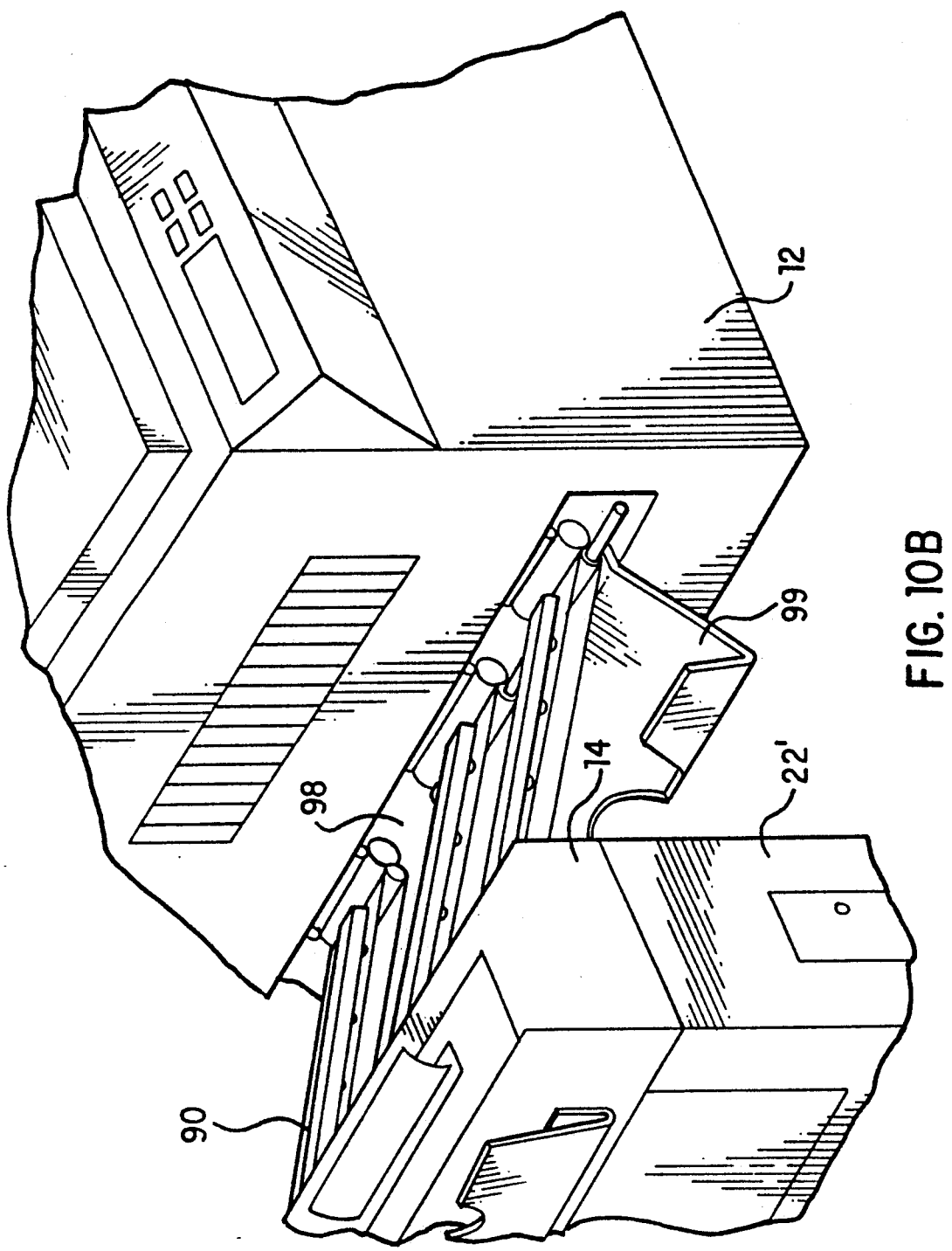

In other cases, because of the shape of the reprographic device 12 at the paper output end, it may be difficult to place the digitizer 14 in the normally desired close proximity to reprographic device 12. Other known paper transport means may then be used to transport the paper output from the reprographic device to the digitizer. For example, referring now to FIG. 10, the end of a "Ramp" device 90 (a driven flexible friction belt system) may be placed so that one end is in proximity to paper output nip 98 of reprographic device 12 to convey the paper to the digitizer 14, the other end of the Ramp 90 being in proximity to the entrance to digitizer 14. Suitable ramp devices are well-known in the art, a typical device 90 utilizing an endless flexible friction belt 96, typically of rubber; paper entering at 92 is constrained to stay in the plane of belt 96 by various balls 94 which contact belt 96, and said paper is thus driven by the moving belt. Paper is diverted to the ramp 90 when gate 97 is in its lower position. After the required pages (e.g. the Title and Author Pages) have been so diverted, gate 97 may be moved to its upper position, causing the following pages to proceed to the output portion 99 (shown in FIG. 10, for example, as a paper tray) of reprographic device 12, as usual. When only a few pages of any given reprographic job are to be digitized and no sorter is involved, this Ramp system 90 is a particularly universal approach.

It is sometimes necessary to apply certain corrections to the copy count when duplex is in use, since there is a roughly 50% probability that the final "original" is in fact blank. Duplex is detected by comparing the pulses from the foreign interface connector with the number of physical sheets counted by a paper switch in the tracking apparatus 10.

Figure 11:
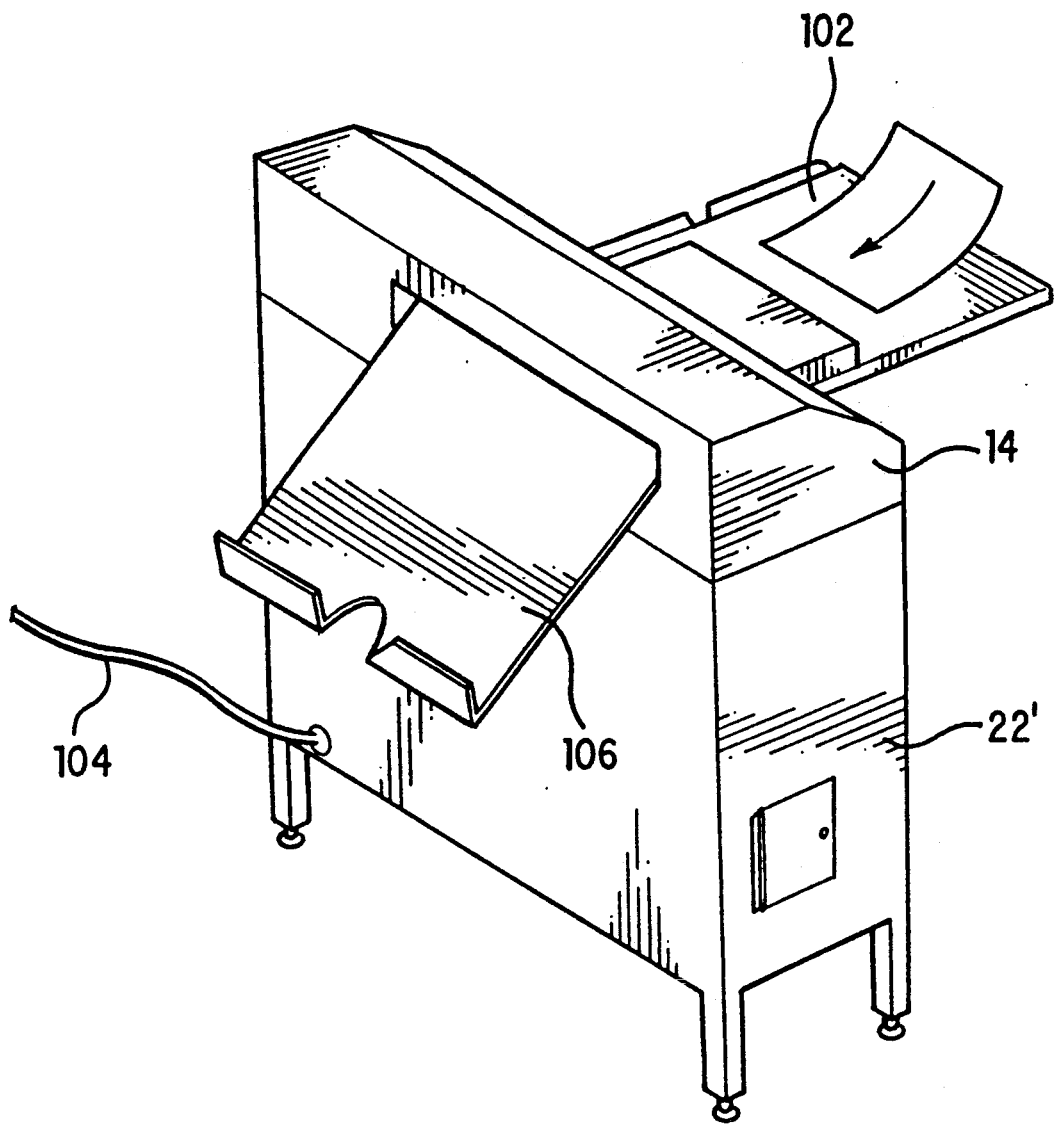
FIG. 11 is a view of a portion of the apparatus according to the present invention, connected to the reprographic device and the rest of the apparatus via a cable.

While maximum automation of the capture of the necessary pages is needed, in some cases, particularly large, high-volume reprographic devices, it may be difficult to insert the digitizer 14 in the paper path. In this case, the digitizer 14 (or the whole tower 22' as shown in FIG. 11) of the apparatus may be mechanically separated from the reprographic device but electrically connected to it and to the rest of the tracking apparatus via cable 104, and the required pages (e.g., the Title and Author Pages) fed in by hand via document feeder 102, with the other electrical functions similar to before. If the digitizer 14 fails to detect paper entrance soon after the reprographic device has output the pages in question, the controller of the tracking apparatus preferably shuts down the reprographic device. Such an approach, while more manual in nature than the situation where digitizer 14 is between the main portion of the reprographic device and its paper output portion, is acceptable at least in the dedicated-operator high-volume environment.

Since the tracking apparatus 10 needs adjustments depending on the reprographic device 12 to which it is attached, many of its electronic parameters are variable by a simple ASCII terminal set-up procedure at the time it is installed on each new reprographic device 12.

The operation of the preferred embodiment of tracking apparatus 10 will now be described. After tracking apparatus 10 has been attached to a reprographic device 12, any user desiring to use reprographic device 12 must first indicate to tracking apparatus 10 whether or not the reprographic job includes published originals. The user indicates this by depressing either of the special "published" or "non-published" buttons on control panel 24. If the "non-published" button is depressed, controller 20 permits reprographic device 12 to perform normally, while still counting total reproductions made. If neither of the buttons is depressed, controller 20 does not issue a Start Enable signal to the foreign interface connector 23, and the reprographic device 12 does not work; a message indicative thereof is displayed on the control panel 24 of the tracking apparatus 10.

If the "published" button is depressed, the LCD display of control panel 24 and/or an audible indication is provided to the user to inform the user to make a reproduction of the Title Page of the copyrighted material. For magazines, the Title Page is normally the cover. For newspapers, it is the banner portion of the front page. For books, it is normally the inside title page. This title page commonly includes the name of the volume, the author and publisher information, and possibly, the ISBN/ISSN number. Reproduction, digitization, and recording of the Title Page enables subsequent identification of the particular publication. When the user makes the reproduction of the Title Page, digitizer 14 digitizes the image of the Title Page, and the digitized image is stored on the recording medium used in recorder 18.

In a "published" job, it is also necessary to capture the Author Page. If the operation of digitizer 14 is comparatively slow, the Author Page is most simply reproduced, digitized and stored as a special page in a manner similar to that of the Title Page. If the author name is not on the first page of the job, the operator may instead be asked to reproduce a different page as the Author Page. Controller 20 ensures that the reprographic device is not Start Enabled at a time which would cause the Title and Author Pages, or the Author Page and the first page of the user's actual job, to collide and cause a paper jam. If the operation of digitizer 14 is sufficiently fast that it need not slow down the paper output from the main portion of reprographic device 12, the Author Page may be captured in most cases merely by digitizing the first page of the user's actual job. As previously described, particularly when a fast digitizer is in use, digitization of the Title Page may optionally be omitted for operator convenience.

After the Title and Author Pages have been reproduced, digitized and stored, the user proceeds with the reprographic job in the normal manner. Through the foreign interface connector, counter 16 determines the number of published reproductions made. The number of reproductions made is stored by recorder 18 along with the Title and Author Page images. Counter 16 also keeps count of the total number of reproductions made during "non-published" jobs and stores it on the recording medium of recorder 18 at appropriate intervals; this permits determination of the percentage of copyright reproductions made.

As a job is completed, the tracking apparatus 10 preferably times out after a predetermined time and waits for a subsequent job. Typically, this time is set in the range between about 15 and 300 seconds, and more preferably between about 30 and 90 seconds. If a user wants to start a new job within this short time frame, depression of the "published" or "non-published" buttons is performed to reset the tracking apparatus 10. If a job is interrupted for any reason, the "continue" button can be depressed to enable the tracking apparatus 10 to continue to count later reproductions as part of the original job.

The recording medium of recorder 18, e.g., a removable magnetic tape cartridge, after completion of the reprographic job, contains the copyright images and job information. The tape cartridge can be removed after an appropriate interval so that a determination can be made of the amount and nature of copyright reproduction performed.

In the tracking of reproduction of copyrighted documents, it may further be desirable to determine the identity of the user performing the job. Accordingly, the tracking apparatus can include keys or other known means, such as ID card readers, on the control panel for receiving input of user identity, the user identity also being recorded by recorder 18. User identification is not, however, required since the validity of the sampling may be improved if users remain anonymous.

Some reprographic devices 12 have a plurality of paper output locations. In this case, digitizer 14 or tower 22' (as in FIG. 11) can be positioned mechanically apart from the reprographic device but with electrical connection 104 to it and to the rest of the tracking apparatus. Copies of the desired pages (such as the Title and Author Pages) are manually inserted via document feeder 102 for conversion of these pages to bit-mapped images and output into tray 106. If digitizer 14 does not sense the feeding of paper within a short time after the appropriate number of pages has been output by the reprographic device (2 pages if capture of the Title and Author Pages is desired), the reprographic device will preferably not be enabled to proceed further. Alternatively, digitizer 14 can be positioned at one of the multiple output trays of the reprographic device. In accordance with this type of positioning, the user either diverts the necessary pages to this output tray by so instructing the reprographic device, or this instruction is provided electronically to the reprographic device by the tracking apparatus.

The tracking apparatus 10 can be used to track the reproduction of different kinds of originals; this may be desired by RRO's in order, for example, to make different charges for different kinds of material. For example, tracking apparatus 10 can track the reproduction of music, the copying of two pages on one sheet, etc, since the nature of such reproduction is readily apparent when the recorded images are later displayed. Furthermore, reproductions can be made on different types of output sheets. For example, copyright copies can be made on transparencies. Tracking apparatus 10 can include structure for detecting this information for recording by recorder 18, so that the user can be charged accordingly. Thus, digitizer 14 can include transmission or reflection optics so as to determine whether paper output or a transparency output is provided from reprographic device 12.

The information derived from the tracking apparatus 10 is preferably processed by a computer system at a centralized location. In a typical implementation, the images on the recording medium are reviewed for observation and more or less manual keyboarding of the pertinent data such as title, author, copy number, etc. Alternatively, optical character recognition or other well-known means to directly capture the bit-mapped information may be used; if a bar-code or the like is visible in the images, this can be decoded by known means.

The tracking apparatus according to the present invention provides virtually automatic capture of digitized images of identifying pages of a user's job, keeps track of the number of reproductions, preferably infers the number of originals and writes all the data on a recording medium.

The tracking apparatus according to the present invention thus enables substantially automatic capture of information necessary for sampling the reproduction of copyright documents on a reprographic device in a manner which is substantially non-invasive and non-damaging of the reprographic device and its electronics. The task of copyright tracking is minimized for the user and can be shifted to a separate centralized information processing center. The tracking apparatus can be used with various reprographic devices since no permanent alterations are required to be made to the reprographic device.

While the tracking apparatus is described in conjunction with the reproduction of copyrighted information, the tracking apparatus can be used to track the content, ownership and/or source of any type of information being reproduced. For example, the reproduction of confidential information can be tracked in accordance with the present invention. Alternatively, reprographic jobs can be tracked simply to ensure that they are appropriate, rather than (for example) for the private purposes of an employee. In applications of this type, all pages being reproduced (or a random selection thereof) can be captured and the operator is normally identified via a key, ID card, or other known method.

In addition, there are many circumstances where the ability to store content information about a reprographic job may be desirable, even where the reproduction of the corresponding original is not restricted. For example, there is a major need for a simple, inexpensive means of storing document information for later retrieval as part of an information storage and retrieval system. The ability to adapt a wide variety of reprographic devices to digitize and record all or part of the output of jobs specified by the user enables such a simple system. Such a system may also include the ability to enter indexing information via a simple keyboard or other device. Retrieval of such information can involve display of the digitized information on a standard computer system, or printing it on a standard electronic printer.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed:

1. An apparatus for tracking the reproduction of at least a portion of a copyrighted document reproduced in a reprographic job performed by a reprographic device, without requiring special identifying coding, markings or characters on said document, said apparatus comprising:

recording means for automatically recording the bibliographic source information about the document contained on at least one page of the document, at least a portion of said page being reproduced by a reprographic device;

connecting means for connecting said apparatus to a main portion of a reprographic device;

counting means for counting a total number of reproductions in the reprographic job performed by the reprographic device;

supply means for supplying said number to said recording means, said number being recorded by said recording means; and control means for controlling said recording means, counting means and supply means.

2. The apparatus according to claim 1, wherein said control means comprises designating means for designating one of two modes of operation of said tracking apparatus, a first of said two modes comprising a mode wherein bibliographic source information is to be recorded and a second of said two modes comprising a mode wherein bibliographic source information is not to be recorded.

3. The apparatus according to claim 2, further comprising image forming means for forming an image of at least a portion of at least one reproduced page of said document, said image forming means forming said image at least when said designating means designates the first of said modes.

4. An apparatus for recording at least one of content, ownership and bibliographic source information about a document, at least a portion of which is reproduced in a reprographic job performed by a reprographic device, without requiring special identifying coding, markings or characters on said document, said apparatus comprising:

recording means for automatically recording an image of at least a portion of at least one page of the document from said reprographic device; and control means for controlling said recording means; and connecting means for at least one of electrically and mechanically connecting said apparatus to a main portion of said reprographic device.

5. The apparatus according to claim 4, wherein said apparatus tracks the reproduction of at least portions of copyrighted documents, said apparatus further comprising:

counting means for counting at least one of a number of originals in the reprographic job and a total number of reproductions made by the reprographic device in the reprographic job; and means to supply at least one of said numbers to said recording means, said recording means recording said supplied number.

6. An apparatus for recording at least one of content, ownership and bibliographic source information about a document, at least a portion of the document being reproduced in a reprographic job performed by a reprographic device, said apparatus comprising:

imaging means for imaging at least a portion of at least one of various pages output from a main portion of said reprographic device after reproduction said various pages comprising a page of the reprographic job and a reproduction of at least a portion of a page of the document containing at least one of ownership and bibliographic source information about the document, the pages to be imaged being supplied to said imaging means from said main portion of said reprographic device without operator intervention;

recording means for recording at least a portion of the images produced by said imaging means;

supply means to supply at least a portion of said images to said recording means;

control means for controlling said imaging means, recording means and supply means; and connecting means for at least one of electrically and mechanically connecting said apparatus to said main portion of said repro-graphic device.

7. The apparatus according to claim 6, wherein said imaging means produces bit-mapped digital images, and said recording means records at least portions of said images in digital form.

8. The apparatus according to claim 7, wherein said connecting means permits said apparatus to be conveniently detached from said reprographic device.

9. The apparatus according to claim 7, wherein said apparatus tracks the reproduction of at least portions of copyrighted documents without requiring special identifying coding of said documents, said apparatus further comprising:

counting means for counting at least one of a number of originals in the reprographic job and a total number of reproductions performed by the reprographic device in the reprographic job; and means to supply at least one of said numbers to said recording means, said recording means recording said supplied number.

10. The apparatus according to claim 7, wherein said imaging means automatically digitizes at least a random portion of the reproduced pages output from the main portion of said reprographic device and said recording means records at least a random portion thereof, said apparatus further comprising prevention means for preventing an ordinary operator of said reprographic device from bypassing said imaging means and said recording means.

11. The apparatus according to claim 6, said control means including designating means for designating one of two modes of operation of said recording apparatus, a first of said two modes comprising a mode wherein at least portions of reproduced pages are to be imaged and recorded and a second of said two modes comprising a mode wherein reproduced pages are not to be imaged and recorded.

12. The apparatus according to claim 11, said control means further including means for controlling operation of said reprographic device, said operation controlling means preventing operation of said reprographic device until said designating means designates one of said modes.

13. The apparatus according to claim 7, wherein said imaging means comprises an integrated contact image sensor, said integrated contact image sensor being in close proximity to the page being imaged, said integrated contact image sensor comprising illumination means, a plurality of lenses, and image detection means.

14. The apparatus according to claim 13, wherein said apparatus tracks the reproduction of at least portions of copyrighted documents, said apparatus further comprising:

counting means for counting at least one of a number of originals in the reprographic job and a total number of reproductions made by the reprographic device in the reprographic job; and means to supply at least one of said numbers to said recording means, said recording means recording said supplied number.

15. The apparatus according to claim 7, wherein said imaging means comprises illumination means, one of a linear and a two-dimensional charge-coupled device array, and at least one lens.

16. The apparatus according to claim 7, further comprising conveying means for conveying the pages to be imaged from a main portion of the reprographic device to said imaging means.

17. The apparatus according to claim 16, wherein at least part of said conveying means runs, at least during the operation of said imaging means, at a speed lower than the speed of pages output from the main portion of said reprographic device, said apparatus further comprising means for gently urging the reproduced pages to be imaged by said imaging means to form a buckle in a space provided therefor between said main portion of said reprographic device and said part of said conveying means, in order to accommodate the difference in said speeds.

18. The apparatus according to claim 12, wherein said reprographic device includes a foreign interface connector, said connecting means connecting said apparatus at least to the foreign interface connector of said reprographic device, said connection of said foreign interface connector to said apparatus constituting the only direct electrical connection between said reprographic device and said apparatus.

19. The apparatus according to claim 7, further comprising deflection means for deflecting pages to be digitized by said imaging means from a main paper flow path of the reprographic device, to one of the imaging means and a holding tray for later transport to the imaging means.

20. The apparatus according to claim 7, wherein said apparatus is adapted to be located between a main portion of said reprographic device and at least one of an output paper tray portion, sorting portion and stapling portion of said reprographic device.

21. The apparatus according to claim 20, further comprising mechanical means for transmitting motion from said main portion of said reprographic device to at least one component of said output paper tray portion, sorting portion and stapling portion.

22. The apparatus according to claim 20, further comprising compensation means for compensating for an increased paper path length between said main portion of the reprographic device and said at least one of an output paper tray portion, sorting portion and stapling portion of the reprographic device.

23. The apparatus according to claim 22, wherein said compensation means comprises at least one of: means for intercepting at least one electrical signal between the main portion of the reprographic device and said at least one of an output paper tray portion, sorting portion and stapling portion of the reprographic device and means for delaying the passage of at least one electrical signal between the main portion of the reprographic device and said at least one of an output paper tray portion, sorting portion and stapling portion of the reprographic device.

24. The apparatus according to claim 22, wherein said compensation means comprises means for intercepting at least one signal from said at least one of an output paper tray portion, sorting portion and stapling portion of said reprographic device, generating means for generating a similar signal in advance of said signal from said at least one of an output paper tray portion, sorting portion and stapling portion, and sending means for sending said similar signal to the main portion of the reprographic device in place of said signal from said at least one of an output paper tray portion, sorting portion and stapling portion.

25. The apparatus according to claim 9, further comprising storage means for temporarily storing a plurality of the digitized images until a last page of the reprographic job is output from the reprographic device, said storage means discarding any of the stored images not to be recorded after said last page is output and then supplying at least portions of undiscarded stored images to said recording means.

26. The apparatus according to claim 9, wherein said original number counting means comprises detecting means for detecting a number of pauses between reproductions by said reprographic device, said pauses being longer than a predetermined normal period between successive reproductions of an original.

27. The apparatus according to claim 9, wherein said original number counting means counts the number of originals to pass through a recirculating document handler of the reprographic device when said recirculating document handler is in use, said original number counting means determining the number of originals present in a document pile in said recirculating document handler.

28. The apparatus according to claim 9, wherein said reprographic device contains a platen and a cover for said platen, and said apparatus further comprises a detector to detect when said platen cover is open, and said original number counting means utilizes information fed from said detector to infer whether or not an automatic document handler of said reprographic device is in use.

29. The apparatus according to claim 8, further comprising:
overlay means for use on at least one of a plurality of control buttons of the reprographic device, said overlay means detecting when an area of said overlay means corresponding to one of said at least one button is pressed by the operator of said reprographic device, said overlay means electrically detecting the presence of pressure on said area of said overlay means, said overlay means at least one of mechanically and electromechanically transmitting said pressure to the corresponding control button; and
transmission means for transmitting a signal indicative of said presence of pressure on said area of said overlay means to at least one of said control means and said recording means.

30. The apparatus according to claim 9, further comprising transparency detection means connected to said recording means, said transparency detection means detecting the presence of a transparency in the output from the main portion of the reprographic device and said recording means recording the presence of the transparency.

31. The apparatus according to claim 30, wherein said transparency detection means comprises an optical detection means.

32. The apparatus according to claim 7, further comprising operator identification means for identifying an operator, said operator identification means providing input to said recording means for recording of the identity of said operator by said recording means, said control means including means for controlling operation of said reprographic device, said operation controlling means preventing operation of said reprographic device until said operator identification means has identified an operator.

33. The apparatus according to claim 8, further comprising transport means to transport the pages to be imaged from the main portion of said reprographic device to said imaging means, said transport means comprising a moving endless belt placed between said main portion of said reprographic device and said imaging means.

34. An apparatus for recording at least one of content, ownership and bibliographic source information about a document, at least a portion of which is reproduced in a reprographic job performed by a reprographic device, said apparatus comprising:
imaging means for forming bit-mapped digital images of at least a portion of at least one of various pages output from a main portion of said reprographic device, said various pages comprising a page of the reprographic job and a reproduction of at least a portion of a page of the document containing at least one of ownership and bibliographic source information about the document, the pages to be imaged being supplied to said imaging means from said main portion of said reprographic device without operator intervention;

manipulating means to electronically manipulate at least a portion of said bit-mapped digital images fed from said imaging means, said manipulating means comprising means to recognize particular patterns in at least a portion of said digital images and to represent at least one of the presence of said patterns or the content of at least a portion of said patterns in digitally-encoded alphanumeric form;

recording means for recording at least one of: at least a portion of said digitally-encoded alphanumeric information, and, when said manipulating means recognizes the presence of said particular patterns, at least a portion of at least one of said bit-mapped digital images;

supply means for supplying said information to be recorded to said recording means;

control means for controlling said imaging means, manipulating means, supply means and recording means; and connecting means for at least one of electrically and mechanically connecting said apparatus to the main portion of said reprographic device.

35. An apparatus for tracking the reproduction of at least a portion of a copyrighted document in a reprographic job by a reprographic device, without requiring special identifying coding, markings or characters, said apparatus comprising:

input means for manually inputting at least one page from a reprographic job;

digital image forming means for forming a bit-mapped digital image of at least a portion of the at least one input page;

recording means for recording at least a portion of the bit-mapped digital image;

electrical connecting means for detachably connecting said apparatus to a reprographic device;

counting means for counting at least one of a number of originals in the reprographic job and a total number of reproductions made by the reprographic device in the reprographic job;

supply means for supplying at least one of said numbers to said recording means, said recording means recording said supplied number; and control means for controlling said recording means, digital image forming means, counting means and supply means.

36. The apparatus according to claim 35, wherein said control means comprises:

designating means for designating one of two modes of operation of said tracking apparatus, a first of said two modes comprising a mode wherein at least portions of pages are to be imaged and recorded and a second of said two modes comprising a mode wherein pages are not to be imaged and recorded;

means for controlling operation of said reprographic device, said operation controlling means preventing operation of said reprographic device until said designating means designates one of said modes; and means limiting operation of said reprographic device in said first mode to a predetermined number of reproduced pages, until said digital image forming means detects the entry of paper.

* * * * *